US012269466B2

(12) United States Patent
Mase et al.

(10) Patent No.: US 12,269,466 B2
(45) Date of Patent: Apr. 8, 2025

(54) DRIVING ASSISTANCE APPARATUS (71) Applicant: TOYOTA JIDOSHA KABUSHIKI KAISHA, Toyota (JP)

(72) Inventors: Yusuke Mase, Nagoya (JP); Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 18/181,663

(22) Filed: Mar. 10, 2023

(65) Prior Publication Data

US 2023/0311857 A1    Oct. 5, 2023

(30) Foreign Application Priority Data

Apr. 1, 2022  (JP) ................................ 2022-061999

(51) Int. Cl.
*B60W 30/085* (2012.01)
*B60W 40/09* (2012.01)

(52) U.S. Cl.
CPC .......... *B60W 30/085* (2013.01); *B60W 40/09* (2013.01); *B60W 2554/4046* (2020.02)

(58) Field of Classification Search
CPC ............... B60W 30/085; B60W 40/09; B60W 2554/4046; B60W 10/06; B60W 10/18; B60W 2520/105; B60W 2540/30; B60W 30/095; B60W 30/09; B60W 30/18009; B60W 10/04; B60W 10/30; B60W 40/08;
(Continued)

(56) References Cited

U.S. PATENT DOCUMENTS

2021/0221364 A1   7/2021  Mase et al.
2021/0221365 A1   7/2021  Mase et al.
(Continued)

FOREIGN PATENT DOCUMENTS

JP   2000289549 A  * 10/2000  ........... B60R 21/013
JP   2013082298 A  *  5/2013
(Continued)

OTHER PUBLICATIONS

Machine Translation of JP2000289549A (Year: 2000).*
Machine Translation of JP2013082298A (Year: 2013).*

*Primary Examiner* — Sahar Motazedi
(74) *Attorney, Agent, or Firm* — Sughrue Mion, PLLC (57) ABSTRACT A driving assistance apparatus performs a deployment control including at least a control to deploy an air-bag of a vehicle when an collision indicating value satisfies a predetermined collision condition, and performs a brake-and-drive control to make a driving force of the vehicle smaller than a required driving force of a driver of the vehicle or to apply a brake force to the vehicle when the collision indicating value does not satisfy the collision condition and/but satisfies a predetermined low impact collision condition that is to be satisfied when a low impact collision having a degree of collision lower than the collision has occurred. In addition, the driving assistance apparatus changes the low impact collision condition in such a manner that the low impact collision condition becomes satisfied more easily as an elapsed time of a state where an anomalous state condition is satisfied becomes longer. The anomalous state condition is a condition to be satisfied when the driver is not driving normally.

1 Claim, 8 Drawing Sheets (58) Field of Classification Search
CPC .............. B60W 40/107; B60W 50/14; B60W 2040/0827; B60R 21/01; B60R 21/0132; B60R 21/16; B60R 2021/0002; B60R 2021/01204
See application file for complete search history.

(56) References Cited

U.S. PATENT DOCUMENTS

| | | |
|---|---|---|
| 2021/0221383 A1 | 7/2021 | Mase et al. |
| 2022/0297681 A1* | 9/2022 | Yoshinaga ...... B60W 30/18109 |
| 2023/0018277 A1* | 1/2023 | Sakai ..................... G06V 20/58 |

FOREIGN PATENT DOCUMENTS

| | | |
|---|---|---|
| JP | 2021-112982 A | 8/2021 |
| JP | 2021-112983 A | 8/2021 |

* cited by examiner

DRIVING ASSISTANCE APPARATUS

TECHNICAL FIELD

The present disclosure relates to a driving assistance apparatus configured to perform a damage mitigation/reduction control to mitigate a damage caused by a collision when a vehicle collides.

BACKGROUND

There has been a known driving assistance apparatus configured to perform a damage mitigation/reduction control when a vehicle collides. As the damage mitigation control, a control (hereinafter, referred to a "deployment control") to deploy an air-bag has been known.

It is preferable that a brake-and-drive control be performed as the damage mitigation control when a low impact collision occurs. A collision degree of the low impact collision is lower than a collision degree of a collision that causes the deployment control to be performed. The brake-and-drive control is a control to make a driving force of the vehicle smaller than a required driving force of a driver or to apply a brake force to the vehicle, in order to mitigate and/or avoid a secondary damage caused when the vehicle collides with another object after a first collision. Such a brake-and-drive control may sometimes be referred as a "secondary damage mitigation/reduction control".

It is preferable that a threshold used for determining whether the brake-and-drive control is to be performed (in other words, a threshold (hereinafter, referred to as a "low impact collision threshold") used for determining whether or not the low impact collision has occurred) be set at a relatively small value that can cause the brake-and-drive control to be performed even when the vehicle collides with a guardrail, a curbstone, or the like.

However, if the low impact collision threshold is set at the relatively small value, there is a possibility that the brake-and-drive control is erroneously performed even when the vehicle travels on a rough road or the like. Therefore, the low impact collision threshold is usually set at a relatively high value.

For example, a driving assistance apparatus (hereinafter, referred to as a "conventional apparatus") disclosed in Japanese Patent Application Laid-Open No. 2021-112983 performs the brake-and-drive control when the driver is in a drowsy/asleep state, and does not perform the brake-and-drive control when the driver is not in the drowsy state, in a case where a collision indicating value indicative of a degree of the collision becomes greater than the low impact collision threshold (namely, when the low impact collision occurs).

SUMMARY

In the conventional apparatus, the condition that the driver is in the drowsy/asleep state needs to be satisfied to perform the brake-and-drive control. Therefore, even when the brake-and-drive control is erroneously performed, it is unlikely that the driver feels annoyed at the brake-and-drive control since the brake-and-drive control alerts the driver who is in the drowsy/asleep state. In view of this, the low impact collision threshold in the conventional apparatus can be set at a relatively small value.

However, the conventional apparatus may erroneously determine that the driver is in the drowsy/asleep state even when he/she is not actually in the drowsy/asleep state. When it is erroneously determined that the driver is in the drowsy/asleep state and the brake-and-drive control is performed, it is likely that the driver feels annoyed at the brake-and-drive control.

The present disclosure is made to cope with the problems described above. That is, one of objectives of the present disclosure is to provide a driving assistance apparatus that can increase a possibility to perform the brake-and-drive control when the vehicle collides with a guardrail, a curbstone, or the like, and also can decrease a possibility that the driver feels annoyed at the brake-and-drive control.

The driving assistance apparatus (hereinafter, referred to as a "present disclosure apparatus") according to the present disclosure comprises:

an acceleration sensor (24) configured to measure an acceleration (G) acting on a body of a vehicle (VA); and a control unit (20, 30, 40) configured to perform a damage mitigation control to mitigate a damage caused by a collision when the vehicle collides, wherein, the control unit is configured to:

perform, as the damage mitigation control, a deployment control that includes at least a control to deploy an air-bag (62) of the vehicle (step 565), when a collision indicating value, obtained based on the acceleration, indicative of a degree of the collision of the vehicle satisfies a predetermined collision condition (step 540: Yes);

perform, as the damage mitigation control, a brake-and-drive control to make a driving force of the vehicle smaller than a required driving force of a driver of the vehicle or to apply a brake force to the vehicle (step 550, step 700 to step 795), when the collision indicating value does not satisfy the collision condition and/but satisfies a predetermined low impact collision condition that is to be satisfied when a low impact collision having a degree of collision lower than the collision has occurred (step 535: Yes, step 545: Yes); and change the low impact collision condition in such a manner the low impact collision condition becomes satisfied more easily as an elapsed time of an anomalous state where the driver is not driving normally becomes longer (step 620 to step 640).

In other words, the control unit is configured to change the low impact collision condition in such a manner that the low impact collision condition becomes satisfied more easily as an elapsed time becomes longer since a time point at which an anomalous state condition becomes satisfied, the elapsed time being a time for which the driver continues being in an anomalous state where the driver is not driving normally, and the anomalous state condition being a condition to be satisfied when the driver fells in the anomalous state.

According to the above embodiment, the low impact collision condition is changed in such a manner the low impact collision condition becomes satisfied more easily as the elapsed time of the anomalous state becomes longer. This can cause the brake-and-drive control to be more easily performed when the low impact collision (collision having a low degree of collision) has occurred. Accordingly, a possibility that the brake-and-drive control is performed when the vehicle collides with a guardrail, a curbstone, or the like is increased, as a possibility that the driver is in the anomalous state is higher. In addition, even when the brake-and-drive control is erroneously performed, the brake-and-drive control warns/alerts the drive who is likely to be in the anomalous state. Thus, it is unlikely that the driver feels annoyed at this brake-and-drive control.

In some embodiments,
the control unit is configured to:
determines that the collision condition is satisfied when the collision indicating value is equal to or greater than a predetermined collision threshold (GAth) (step 540: Yes);
determines that the low impact collision condition is satisfied when at least a first condition is satisfied (step 535: Yes), the first condition being a condition that the collision indicating value is equal to or greater than a predetermined low impact collision threshold (GBth) that has been set at a value smaller than the collision threshold and is smaller than the collision threshold; and
make the low impact collision condition be satisfied more easily as the elapsed time is longer, by making the low impact collision threshold smaller (step 620, step 625, step 635).

This decreases the low impact collision threshold as the elapsed time is longer, and thus, can make the low impact collision condition be certainly satisfied as the elapsed time is longer.

In some embodiments,
the control unit is configured to determine that the low impact collision is satisfied, when the first collision is satisfied (step 535: Yes) and a second condition is satisfied (step 545: Yes), the second condition being a condition that a magnitude of an integral value of the collision indicating value is equal to or greater than a predetermined integral value threshold.

The magnitude of the integral value of the collision indicating value obtained when the low impact collision has occurred tends to be greater than a magnitude of the integral value of the collision indicating value obtained when the vehicle is traveling on a rough road. Therefore, the above embodiment can decrease a possibility to erroneously determine that the low impact collision becomes satisfied when the vehicle is traveling on the rough road.

In some embodiments,
the control unit is configured to make the low impact collision condition be satisfied more easily as the elapsed time is longer, by making the low impact collision threshold smaller and making the integral value threshold smaller (step 620 to step 640).

This decreases the low impact collision threshold and the integral value threshold as the elapsed time is longer, and thus, can make the low impact collision condition be certainly satisfied as the elapsed time is longer.

In some embodiments,
the control unit is configured to determine that an anomalous state condition being a condition to be satisfied when the driver is in the anomalous state is satisfied, when an erroneous operation state where the diver erroneously operates an acceleration element that is an element to be operated in order to accelerate the vehicle has occurred (step 410: Yes), or when the driver is in an asleep state (step 310: Yes).

It is likely that the driver is not driving normally, when the erroneous operation state has occurred or when he/she in the asleep state. In such a case, the above-described embodiment lets the anomalous state be satisfied, and lets the low impact collision condition be more easily satisfied as the elapsed time from the time point at which the anomalous state became satisfied becomes longer. Accordingly, the brake-and-drive control is performed when the lower impact collision has occurred in such a case, and a possibility that the driver feels annoyed at the brake-and-drive control can be decreased even when the brake-and-drive control is erroneously performed.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

Figure 1:
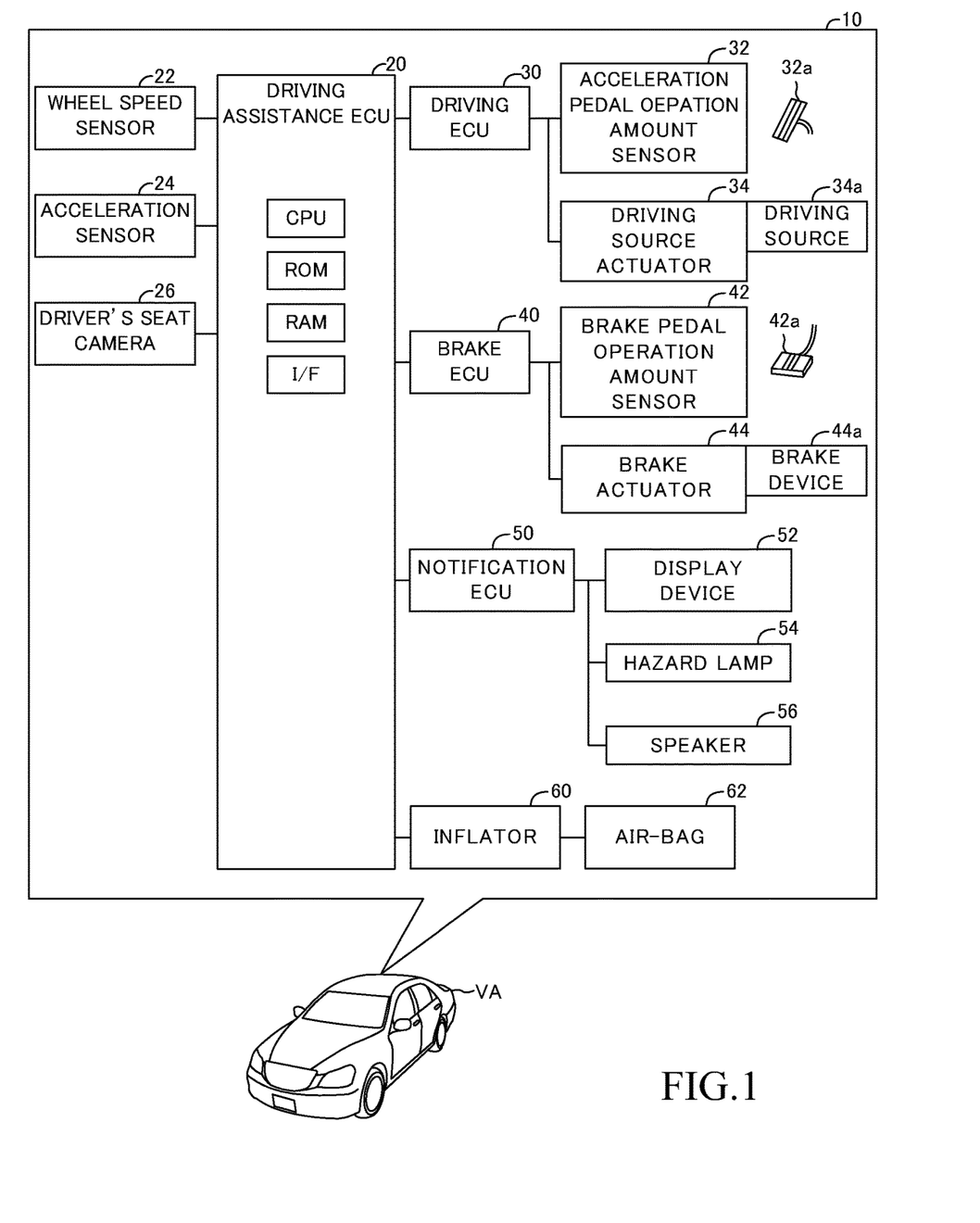
FIG. 1 is a schematic diagram of a system of a driving assistance apparatus according to an embodiment of the present disclosure.

A driving assistance/supporting apparatus (hereinafter, referred to as a "present assistance apparatus") 10 according to an embodiment of the present disclosure is applied to (or installed in) a vehicle VA. As shown in FIG. 1, the present assistance apparatus 10 comprises a driving assistance/supporting ECU (hereinafter, referred to as a "DSECU") 20, a driving ECU 30, a brake ECU 40, and a notification ECU 50. These ECUs are communicably connected with each other so as to be able to mutually exchange data with each other through a CAN (Controller Area Network).

An "ECU" is an abbreviation of an "Electronic Control Unit" that is an electronic control circuit including a microcomputer as a main component. The microcomputer includes a CPU, a ROM, a RAM, and an interface (I/F). The ECU may sometimes be referred to as a "control unit", a "controller", or a "computer". The CPU is configured and/or programmed to realize various functions by executing instructions (routines) stored in a memory (the ROM). Some or all of the ECUs 20-50 may be integrated into a single ECU.

The DSECU 20 is connected with a plurality of wheel speed sensors 22, an acceleration sensor 24, and a driver's seat camera 26, so as to be able to exchange data with each of them.

The wheel speed sensors 22 are provided to respective wheels of the vehicle VA. Each of the wheel speed sensors 22 generates one pulse signal when the corresponding wheel rotates by a predetermined angle. The DSECU 20 counts the number of the pulse signals from each of the wheel speed sensors 22 per unit time, and obtain a wheel rotational speed (or a wheel speed) of each of the wheels based on the counted number. The DSECU 20 obtains a vehicle speed Vs indicative of a moving speed of the vehicle VA based on the wheel rotational speeds of the wheels. For instance, the DSECU 20 obtains an average of the wheel speeds of four of the wheels as the vehicle speed Vs.

The acceleration sensor 24 measures an acceleration G (an acceleration of the vehicle VA in a front-rear direction of the vehicle VA, and an acceleration of the vehicle VA in a left-right (lateral) direction of the vehicle VA) of a vehicle body of the vehicle VA. The DSECU 20 specifies/obtains the acceleration G based on a detected signal from the acceleration sensor 24.

The driver's seat camera 26 obtains a driver's seat image by taking a picture of a scene of an area including a position of a face of a driver seated in a driver's seat of the vehicle VA. The driver's seat camera 26 transmits the driver's seat image to the DSECU 20.

The DSECU 30 is connected with an acceleration pedal operation amount sensor 32 and a driving source actuator 34 so as to mutually exchange data therebetween.

The acceleration pedal operation amount sensor 32 detects an operation amount of an acceleration pedal 32a of the vehicle VA (a depressing amount of the acceleration pedal 32a by the driver), and generates a detected signal indicative of this operation amount. Hereinafter, the operation amount of the acceleration pedal 32a is referred to as an "accelerator operation amount AP". The acceleration pedal 32a is an operation element operated by the driver in order to accelerate the vehicle VA, and may sometimes be referred to as an "acceleration operation element".

The driving source actuator 34 is connected to a driving source (e.g., the motor and the internal combustion engine) 34a. The driving ECU 30 varies a driving state of the driving source 34a by controlling the driving source actuator 34. Thus, the driving ECU 30 is able to adjust a driving force applied to the vehicle VA (a driving force generated by the driving source 34a). The driving ECU 30 controls the driving source actuator 34 in such a manner that the driving force applied to the vehicle VA becomes greater as the accelerator operation amount AP becomes greater.

The brake ECU 40 is connected with a brake pedal operation amount sensor 42 and a brake actuator 44 so as to mutually exchange data therebetween.

The brake pedal operation amount sensor 42 detects an operation amount of a brake pedal 42a of the vehicle VA (a depressing amount of the brake pedal 42a), and generates a detected signal indicative of this operation amount. Hereinafter, the operation amount of the brake pedal 42a is referred to as a "brake operation amount BP".

The brake actuator 44 is connected with a well-known hydraulic brake device 44a. The brake ECU 40 varies a frictional brake force generated by the brake device 44a by controlling the brake actuator 44. Thus, the brake ECU 40 is able to adjust/control a brake force applied to the vehicle VA. The brake ECU 40 controls the brake actuator 44 in such a manner that the brake force applied to the vehicle VA becomes greater as the brake operation amount BP becomes greater.

The notification ECU 50 is connected with a display device 52, a hazard lamp 54, and a speaker 56, so as to mutually exchange data therebetween.

The display device 52 is, for example, a multi-information display, and is arranged at a position that faces the driver seated in the driver's seat. The display device 52 includes an unillustrated erroneous operation indicating lamp and an unillustrated drowsing/asleep state indicating lamp. The erroneous operation indicating lamp is turned on when it is determined that the driver erroneously operates the acceleration pedal 32a. The drowsing state indicating lamp is turned on when it is determined that the driver is in the drowsy/asleep state.

The hazard lamp 54 is turned on when it is determined that the driver is in the drowsy/asleep state.

The speaker 56 is caused to generate a warning sound when it is determined that the driver is in the drowsy/asleep state.

The DSECU 20 is connected with an inflator 60 so as to mutually exchange data therebetween.

The inflator 60 deploys (inflates) an air-bag 62 by generating gas when it receives an ignition signal from the DSECU 20. An appropriate number of the air-bags 62 are disposed at respective appropriate positions of the vehicle VA.

(Outline of Operation)

The present assistance apparatus 10 is configured to perform the deployment control when a collision condition becomes satisfied. The collision condition becomes satisfied when a magnitude of the acceleration G is greater than a predetermined collision threshold GAth. The deployment control includes a control to deploy/inflate the air-bag 62 and a control to apply the brake force to the vehicle VA. It should be noted that the acceleration G is a value indicative of a collision degree (degree of a collision) of the vehicle, and may sometimes be referred to as a "collision indicating value". The collision indicating value is not limited to the acceleration G, but may be a value obtained based on the acceleration G. For instance, the collision indicating value may be a product of a mass of the vehicle VA and the acceleration G.

The present assistance apparatus 10 determines that a "low impact collision whose collision degree is lower/lighter than a collision degree of a collision that causes the above-described collision condition to be satisfied" has occurred, when a low impact collision condition becomes satisfied. The low impact collision condition is satisfied when both of a first condition and a second condition, described below, are satisfied. When the present assistance apparatus 10 determines that the low impact collision has occurred, it performs the brake control to apply the brake force to the vehicle VA. The brake control that is performed when the low impact collision condition becomes satisfied is referred to as a "first brake control" or a "brake-and-drive control". Whereas, the "brake control of the deployment control" that is performed when the collision condition becomes satisfied is referred to as a "second brake control".

"The brake control performed when the low impact collision condition becomes satisfied" and "the deployment control performed when the collision condition becomes satisfied" are controls to mitigate/reduce a damage upon the collision (or after the collision), and each of them may sometimes be referred as a damage mitigation/reduction control.

First condition: the magnitude of the acceleration G is equal to or greater than a predetermined low impact collision threshold GBth and is smaller than the collision threshold GAth.

Second condition: a magnitude of an acceleration integral value V that is a value of integral of the acceleration G is equal to or greater than an integral value threshold Vth.

The low impact collision threshold GBth has been set to a value smaller than the collision threshold GAth.

The present assistance apparatus 10 continues determining whether or not an anomalous state condition is satisfied. The anomalous state condition is a condition to be satisfied when the driver is in an anomalous state where he/she cannot drive the vehicle normally/properly. More specifically, the present assistance apparatus 10 determines that the anomalous state condition becomes satisfied, when one of conditions C1 and C2 described below become satisfied.

Condition C1: a state where the driver is in the drowsy/asleep state continues for a predetermined determination time Td since a time point (time point t1 shown in FIG. 2) at which it was detected/determined that the driver had fallen into the drowsy/asleep state.

Condition C2: a state where the driver erroneously operates the acceleration pedal 32a continues for the determination time Td since a time point at which it was detected/determined that the driver had erroneously operated the acceleration pedal 32a.

The present assistance apparatus 10 changes the low impact collision condition in such a manner that the low impact collision condition is satisfied more easily as a time (hereinafter, referred to as an "elapsed time") for which the driver continues being in the anomalous state since a time point at which the above-described anomalous state condition became satisfied is longer. For example, the present assistance apparatus 10 makes both of the low impact collision threshold GBth and the integral value threshold Vth smaller as the elapsed time becomes longer.

A possibility that the driver is in the anomalous state becomes higher, as the above-described elapsed time becomes longer. In addition, a possibility that the first brake control is erroneously performed becomes higher, as the low impact collision condition becomes more easily satisfied.

Even when the first brake control is erroneously performed in a case where the driver is in the anomalous state, it is unlikely that the driver feels annoyed at the first brake control because of the following reasons.

When the driver erroneously operates the acceleration pedal 32a, the vehicle VA is accelerated against the driver's intention. Therefore, even when the first brake control is performed in this case, it is unlikely that the driver feels annoyed at the first brake control.

When the driver is in the drowsy/asleep state, the driver may arise from the sleep by the brake control. Therefore, even when the first brake control is performed in this case, it is unlikely that the driver feels annoyed at the first brake control.

Since the present assistance apparatus 10 changes the low impact collision condition in such a manner that the low impact collision condition is satisfied more easily as the possibility that the driver is in the anomalous state is higher, a possibility that the first brake control is performed becomes higher even when a low impact collision (the collision between the vehicle and a guardrail, a curbstone, or the like) that does not cause the deployment control to be performed occurs. This can increase a possibility to reduce the secondary damage after the occurrence of the low impact collision. In addition, the possibility that the first brake control is erroneously performed becomes higher, when the low impact collision condition becomes more easily satisfied. However, even when the first brake control is erroneously performed, it is unlikely that the driver feels annoyed at the first brake control because a possibility that the driver is in the anomalous state is high.

Example of Operations

Figure 2:
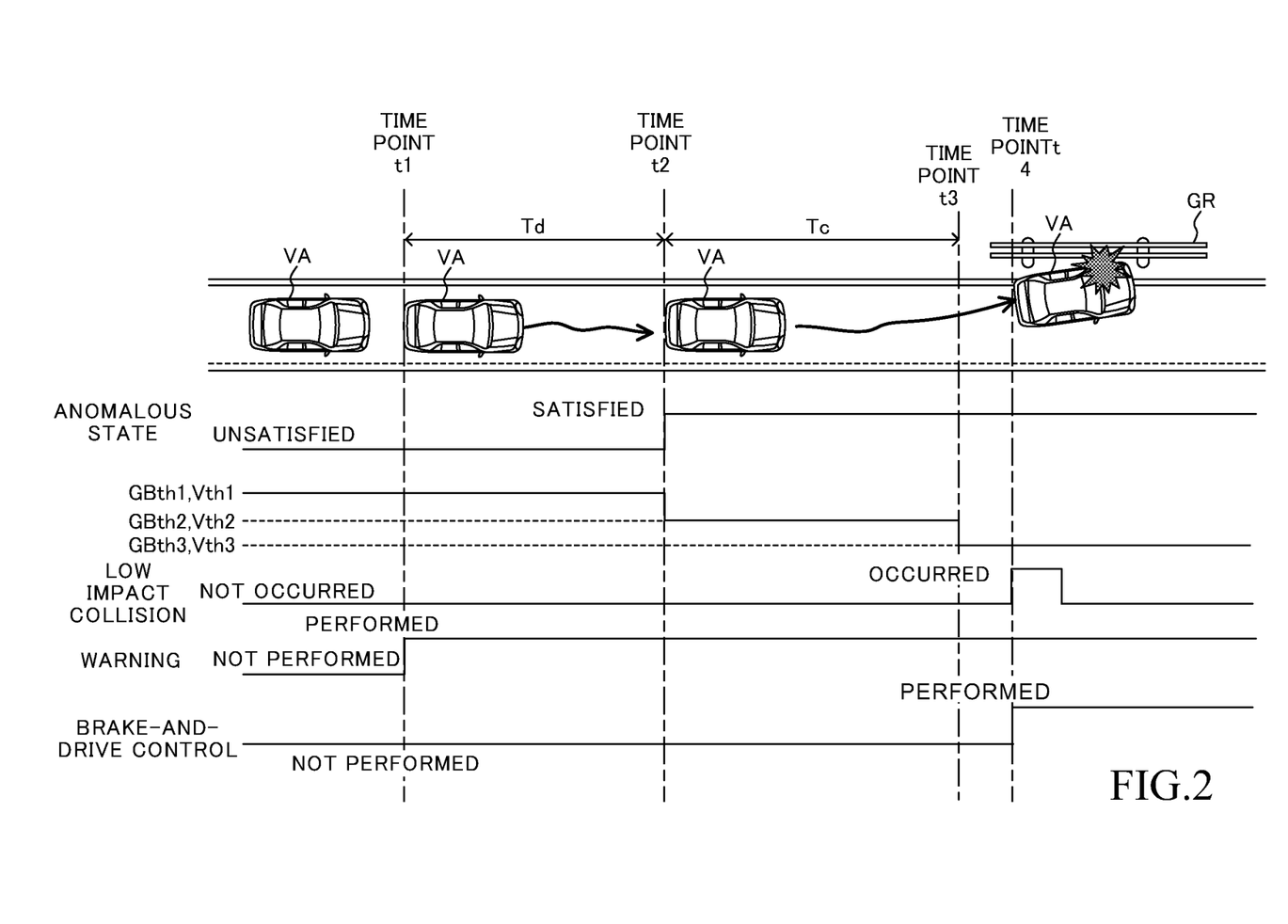
FIG. 2 is a drawing for describing an outline of an operation of the driving assistance apparatus according to the embodiment of the present disclosure.

An example of the operations of the present assistance apparatus 10 will next be described with reference to FIG. 2.

<Time Point t1>

At a time point t1, the present assistance apparatus 10 detects, based on the driver's seat image, that the driver is in the drowsy/asleep state, and generates the warning to the driver. More specifically, the present assistance apparatus 10 turns on the drowsing state indicating lamp of the display device 52, turns on the hazard lamp 54, and causes the speaker 56 to generate the warning sound.

<Time Point t2>

A time point t2 is a time point at which the state where the driver is in the drowsy/asleep state continues for the determination time Td from the time point t1. At the time point t2, the present assistance apparatus 10 determines that the above-described condition C1 becomes satisfied, and therefore, the present assistance apparatus 10 determines that the anomalous state condition becomes satisfied.

Meanwhile, in a normal period for which the anomalous state condition is unsatisfied, the present assistance apparatus 10 sets the low impact collision threshold GBth to "GBth1", and sets the integral value threshold Vth to "Vth1". At the time point t2, the present assistance apparatus 10 sets the low impact collision threshold GBth to "GBth2", and sets the integral value threshold Vth to "Vth2". The value of "GBth2" is smaller than the value of "GBth1", and the value of "Vth2" is smaller than the value of "Vth1".

<Time Point t3>

At a time point t3 at which a constant time Tc elapses since the time point t2 at which the anomalous state condition becomes satisfied, the present assistance apparatus 10 sets the low impact collision threshold GBth to "GBth3", and sets the integral value threshold Vth to "Vth3". The value of "GBth3" is smaller than the value of "GBth2", and the value of "Vth3" is smaller than the value of "Vth2".

<Time Point t4>

At a time point t4, the vehicle VA collides with a guardrail GR, and thus, the acceleration G becomes equal to or greater than the low impact collision threshold GBth3, and the acceleration integral value V becomes equal to or greater than the integral value threshold Vth3. At the time point t4, the present assistance apparatus 10 determines that the low impact collision condition becomes satisfied so as to perform the first brake control.

For example, it is assumed that the acceleration G at the time point t4 is equal to or greater than the value of GBth3 and is smaller than the value of GBth2, and the acceleration integral value V at the time point t4 is equal to or greater than the value of Vth3 and smaller than the value of Vth2. The present assistance apparatus 10 changes the low impact collision condition in such a manner that the low impact collision condition is satisfied more easily as the above-described elapsed time becomes longer. Thus, the present assistance apparatus 10 can determine/regard the collision between the vehicle VA and the guardrail at the time point t4 as the low impact collision, so as to be able to perform the first brake control at the time point t4.

(Specific Operation)
<Drowsy/Asleep State Determining Routine>

The CPU of the DSECU 20 (hereinafter, the "CPU" means the CPU of the DSECU 20 unless otherwise specified) is configured or programmed to execute a drowsy/asleep state determining routine shown by a flowchart in FIG. 3 every time a predetermined time elapses.

Figure 3:
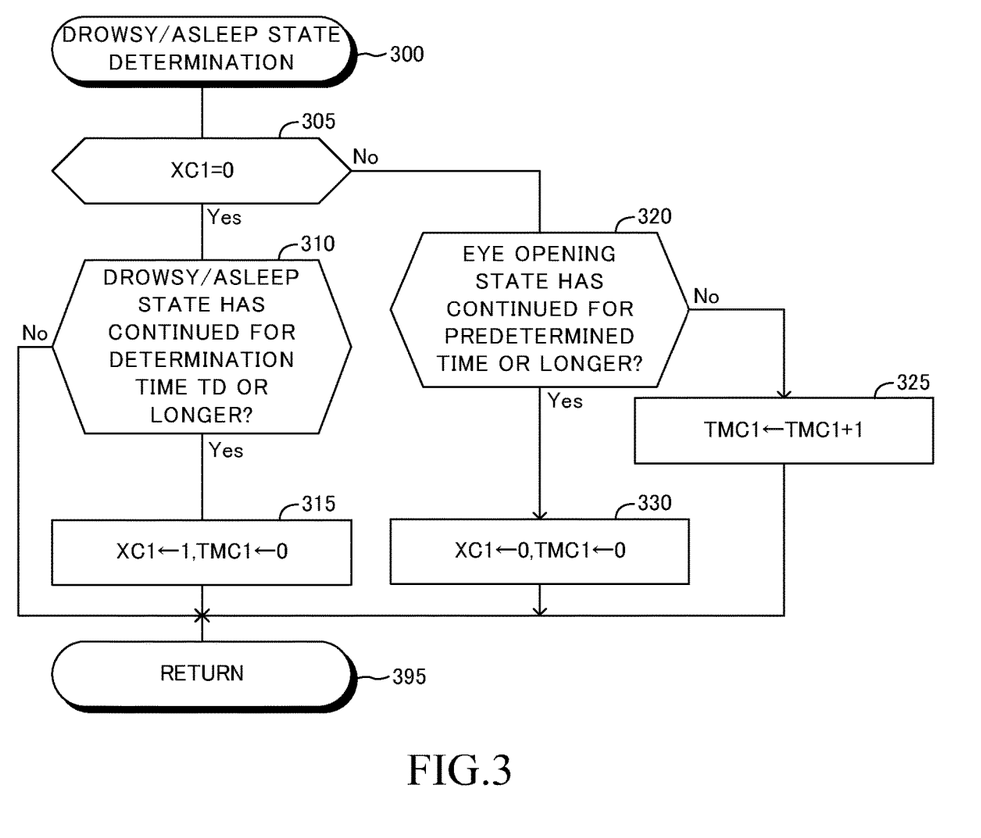
FIG. 3 is a flowchart illustrating a drowsy/asleep state determining routine executed by a CPU of a driving assistance ECU shown in FIG. 1.

When an appropriate time point comes, the CPU starts processing from step 300 in FIG. 3, and proceeds to step 305. At step 305, the CPU determines whether or not a value of an asleep state flag XC1 is "0".

The value of the asleep state flag XC1 is set to "1" when the above-described condition C1 becomes satisfied (refer to step 315), and is set to "0" when it is determined that the driver returns to a normal state from the drowsy/asleep state (refer to step 330). In addition, the value of the asleep state flag XC1 is set to "0" in an initialization routine executed by the CPU when a position of an unillustrated ignition switch is changed to an on position from an off position.

When the value of the asleep state flag XC1 is "0", the CPU makes a "Yes" determination at step 305, and proceeds to step 310. At step 310, the CPU determines, based on the driver's seat image, whether or not the drowsy/asleep state has continued for the determination time Td or longer (i.e., whether or not the above-described condition C1 becomes satisfied).

More specifically, the CPU determines that the driver has fallen into the drowsy/asleep state when a state where the driver closes his/her eyes continues for a predetermined time or longer. Then, the CPU determines whether or not a state where the driver is in the drowsy/asleep state continues for the determination time Td since it was determined that the driver had fallen into the drowsy/asleep state. When the CPU determines that the driver has fallen into the drowsy/asleep state, the CPU turns on the drowsing state indicating lamp, turns on the hazard lamp 54, and starts causing the speaker 56 to generate the warning sound.

When the state where the driver is in the drowsy/asleep state has not continued for the determination time Td or loner, the CPU makes a "No" determination at step 310, and proceeds to step 395 to terminate the present routine tentatively.

Whereas, when the state where the driver is in the drowsy/asleep state has continued for the determination time Td or loner, the CPU makes a "Yes" determination at step 310, and proceeds to step 315. At step 315, the CPU sets the value of the asleep state flag XC1 to "1", and sets a value of an asleep state timer TMC1 to "0". Thereafter, the CPU proceeds to step 395 to terminate the present routine tentatively.

The asleep state timer TMC1 is a timer for measuring an elapsed time since a time point at which the above-described condition C1 becomes satisfied.

In contrast, if the value of the asleep state flag XC1 is "1" when the CPU proceeds to step 305, the CPU makes a "No" determination at step 305, and proceeds to step 320. At step 320, the CPU determines whether or not a state (hereinafter, referred to as an "eye opening state") where the driver opens his/her eyes has continued for a predetermined time or longer.

When the eye opening state has not continued for the predetermined time or longer, the CPU makes a "No" determination at step 320, and proceeds to step 325. At step 325, the CPU increments the value of the asleep state timer TMC1 by "1", and proceeds to step 395 to terminate the present routine tentatively.

Whereas, when the eye opening state has continued for the predetermined time or longer, the CPU makes a "Yes" determination at step 320, and proceeds to step 330. At step 330, the CPU sets the value of the asleep state flag XC1 to "0", and sets a value of an asleep state timer TMC1 to "0". Thereafter, the CPU proceeds to step 395 to terminate the present routine tentatively.

<Erroneous Operation Determining Routine>

Figure 4:
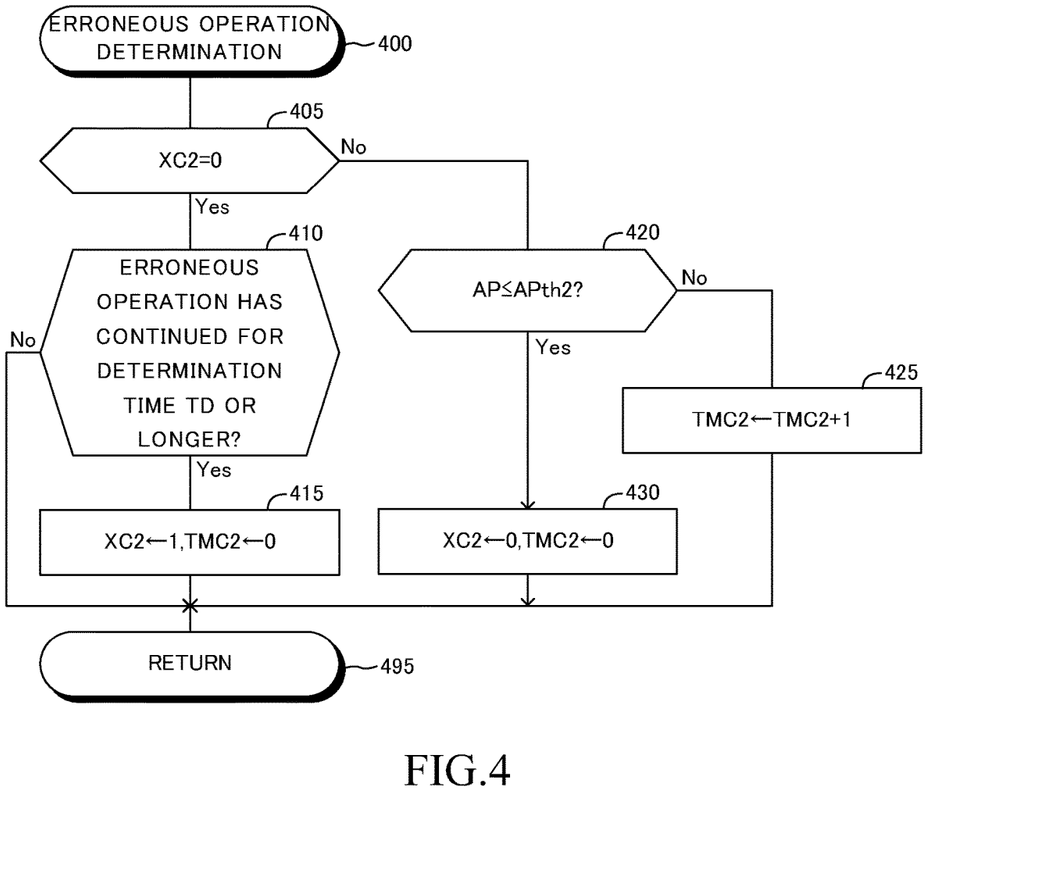
FIG. 4 is a flowchart illustrating an erroneous operation determining routine executed by the CPU of the driving assistance ECU shown in FIG. 1.

The CPU is configured or programmed to execute an erroneous operation determining routine shown by a flowchart in FIG. 4 every time a predetermined time elapses.

When an appropriate time point comes, the CPU starts processing from step 400 in FIG. 4, and proceeds to step 405. At step 405, the CPU determines whether or not a value of an erroneous operation flag XC2 is "0".

The value of the erroneous operation flag XC2 is set to "1" when the above-described condition C2 becomes satisfied (refer to step 415), and is set to "0" when it is determined that an erroneous operation to the acceleration pedal 32a is no longer performed (refer to step 430). Furthermore, the value of the erroneous operation flag XC2 is set to "0" in the above-described initialization routine.

When the value of the erroneous operation flag XC2 is "0", the CPU makes a "Yes" determination at step 405, and proceeds to step 410. At step 410, the CPU determines, based on the accelerator operation amount AP, whether or not the erroneous operation to the acceleration pedal 32a has continued for the determination time Td or longer.

More specifically, the CPU determines that the erroneous operation to the acceleration pedal 32a has been performed (detects the erroneous operation to the acceleration pedal 32a) when the accelerator operation amount AP becomes equal to or greater than a predetermined first operation threshold APth1 within a predetermined time from a time point at which an accelerator operation rate/speed APV becomes equal to or greater than a predetermined rate threshold APVth. Then, the CPU determines whether or not a state where the accelerator operation amount AP is greater than a "predetermined second operation threshold APth2 that has been set at a value smaller than the first operation threshold APth1" has continued for the determination time Td or longer since the erroneous operation to the acceleration pedal 32a was detected.

When the erroneous operation to the acceleration pedal 32a has not continued for the determination time Td or longer, the CPU makes a "No" determination at step 410, and proceeds to step 495 to terminate the present routine tentatively.

Whereas, when the erroneous operation to the acceleration pedal 32a has continued for the determination time Td or longer, the CPU makes a "Yes" determination at step 410, and proceeds to step 415. At step 415, the CPU sets the value of the erroneous operation flag XC2 to "1", and sets a value of an erroneous operation timer TMC2 to "0". Thereafter, the CPU proceeds to step 495 to terminate the present routine tentatively.

The erroneous operation timer TMC2 is a timer for measuring an elapsed time since a time point at which the above-described condition C2 becomes satisfied.

In contrast, if the value of the erroneous operation flag XC2 is "1" when the CPU proceeds to step 405, the CPU makes a "No" determination at step 405, and proceeds to step 420. At step 420, the CPU determines whether or not the accelerator operation amount AP is equal to or smaller than the second operation threshold APth2.

When the accelerator operation amount AP is greater than the second operation threshold APth2, the CPU determines that the erroneous operation to the acceleration pedal 32*a* still continues. In this case, the CPU makes a "No" determination at step 420, and proceeds to step 425. At step 425, the CPU increments the value of the erroneous operation timer TMC2 by "1", and proceeds to step 495 to terminate the present routine tentatively.

Whereas, when the accelerator operation amount AP is equal to or smaller than the second operation threshold APth2, the CPU determines that the erroneous operation to the acceleration pedal 32*a* has ended. In this case, the CPU makes a "Yes" determination at step 420, and proceeds to step 430. At step 430, the CPU sets the value of the erroneous operation flag XC2 to "0", and sets the value of the erroneous operation timer TMC2 to "0". Thereafter, the CPU proceeds to step 495 to terminate the present routine tentatively.

<Collision Determining Routine>

Figure 5:
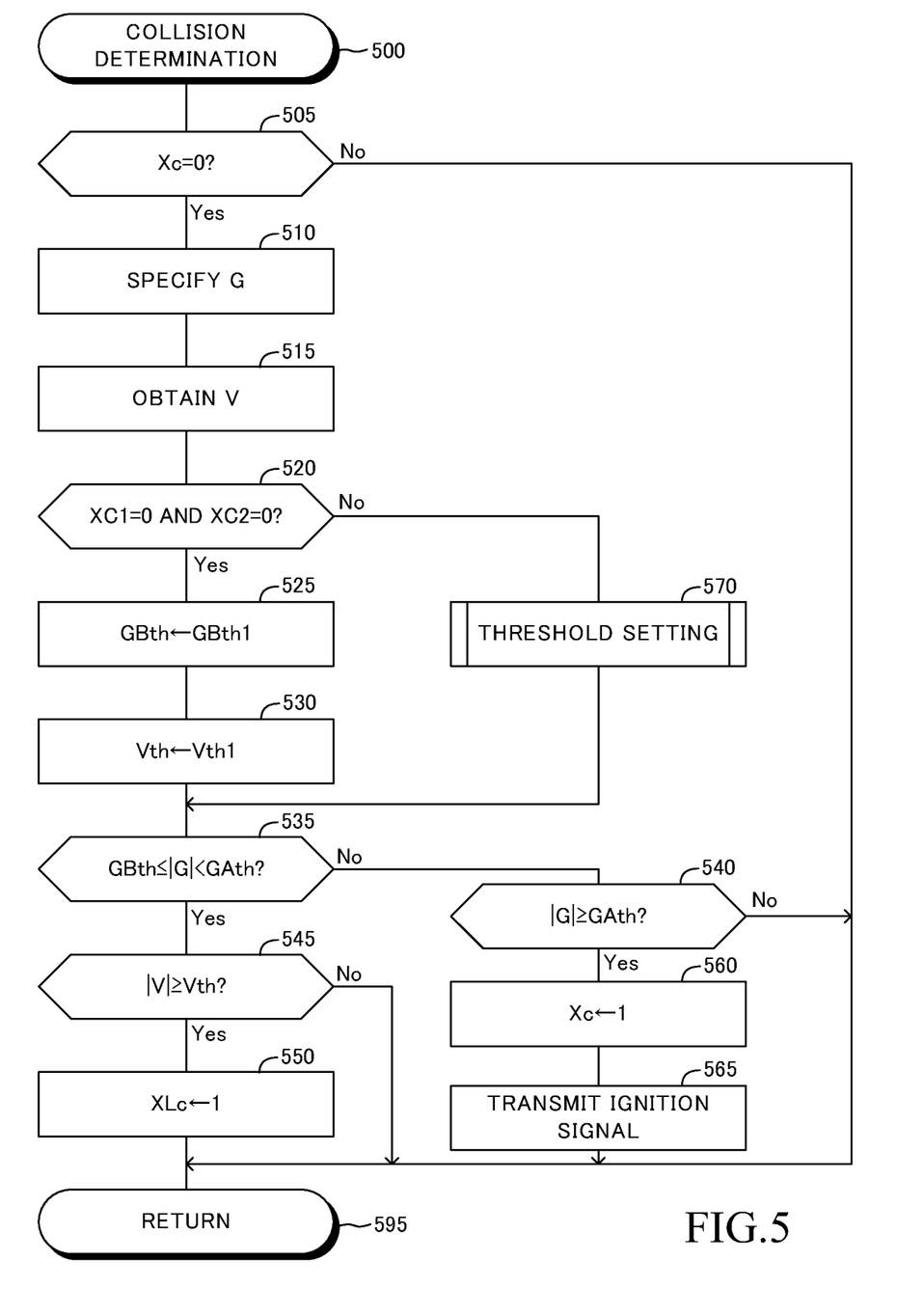
FIG. 5 is a flowchart illustrating a collision determining routine executed by the CPU of the driving assistance ECU shown in FIG. 1.

The CPU is configured or programmed to execute a collision determining routine shown by a flowchart in FIG. 5 every time a predetermined time elapses.

When an appropriate time point comes, the CPU starts processing from step 500 in FIG. 5, and proceeds to step 505. At step 505, the CPU determines whether or not a value of a collision flag Xc is "0".

The value of the collision flag Xc is set to "1" when it is determined that the collision has occurred (refer to step 560), and is set to "0" when an end condition of a second brake control described later becomes satisfied (step 825 shown in FIG. 8). The value of the collision flag Xc is set to "0" in the above-described initialization routine.

When the value of the collision flag Xc is "0", the CPU makes a "Yes" determination at step 505, and sequentially executes processes of step 510 and step 520.

Step 510: the CPU obtains the acceleration G based on the detected signal from the acceleration sensor 24.

Step 515: the CPU obtains the acceleration integral value V by integrating the acceleration G.

The integrating process of the acceleration G is disclosed in paragraphs 0044 to 0047 of Japanese Patent Application Laid-Open No. 2021-112983, and thus, will next be briefly described.

The CPU obtains, as the acceleration integral value V, an integral value of the acceleration G between a start time point described below and an end time point described below.

The start time point (start timing of the integration) is a time point at which an interval integral value of the acceleration G becomes equal to or greater than a first integral value threshold. The interval integral value is an integral value of the acceleration G for a predetermined integral interval.

The end time point (end timing of the integration) is a first end timing described below or a second end timing described below, whichever comes first.

The first end timing is a timing at which a first set time elapses after the interval integral value becomes equal to or smaller than a second integral value threshold.

The second end timing is a timing at which a second set time elapses after the start time point (start timing of the integration). The second set time has been set to a time longer than the first set time.

Step 520: the CPU determines whether or not both of the value of the asleep state flag XC1 and the value of the erroneous operation flag XC2 are "0".

When both of the value of the asleep state flag XC1 and the value of the erroneous operation flag XC2 are "0", the CPU makes a "Yes" determination at step 520, and sequentially executes processes of step 525 to step 535.

Step 525: the CPU sets the value of the low impact collision threshold GBth to the value of GBth1.

Step 530: the CPU sets the value integral value threshold Vth to the value of Vth1.

Step 535: the CPU determines whether or not the magnitude of the acceleration G is equal to or greater than the low impact collision threshold GBth and is smaller than the collision threshold GAth.

When the acceleration G is smaller than the low impact collision threshold GBth or greater than the collision threshold GAth, the CPU makes a "No" determination at step 535, and proceeds to step 540. At step 540, the CPU determines whether or not the magnitude of the acceleration G is equal to or greater than the collision threshold GAth.

When the magnitude of the acceleration G is smaller than the collision threshold GAth, the CPU makes a "No" determination at step 540, and proceeds to step 595 to terminate the present routine tentatively.

If the magnitude of the acceleration G is equal to or greater than the low impact collision threshold GBth and is smaller than the collision threshold GAth when the CPU proceeds to step 535, the CPU makes a "Yes" determination at step 535, and proceeds to step 545.

At step 545, the CPU determines whether or not the magnitude of the acceleration integral value V is equal to or greater than the integral value threshold Vth.

When the magnitude of the acceleration integral value V is smaller than the integral value threshold Vth, the CPU determines that the low impact collision has not occurred. In this case, the CPU makes a "No" determination at step 545, and proceeds to step 595 to terminate the present routine tentatively.

Whereas, when the magnitude of the acceleration integral value V is equal to or greater than the integral value threshold Vth, the CPU determines that the low impact collision has occurred. In this case, the CPU makes a "Yes" determination at step 545, and proceeds to step 550. At step 550, the CPU sets a value of a low impact collision flag XLc to "1", and proceeds to step 595 to terminate the present routine tentatively.

If the magnitude of the acceleration G is equal to or greater than the collision threshold GAth when the CPU proceeds to step 540, the CPU determines that the collision has occurred. In this case, the CPU makes a "Yes" determination at step 540, and sequentially executes processes of step 560 and step 565.

Step 560: the CPU sets the value of the collision flag Xc to "1".

Step 565: the CPU transmits the ignition signal to the inflator 60.

As described above, when the inflator 60 receives the ignition signal, the inflator 60 deploys/inflates the air-bag 62.

Thereafter, the CPU proceeds to step 595 to terminate the present routine tentatively.

If at least one of the value of the asleep state flag XC1 and the value of the erroneous operation flag XC2 is "1" when the CPU proceeds to step 520, the CPU makes a "No" determination at step 520, and proceeds to step 570 so as to execute a threshold setting sub routine. Thereafter, the CPU performs processes of step 535 and subsequent steps.

<Threshold Setting Sub Routine>

Figure 6:
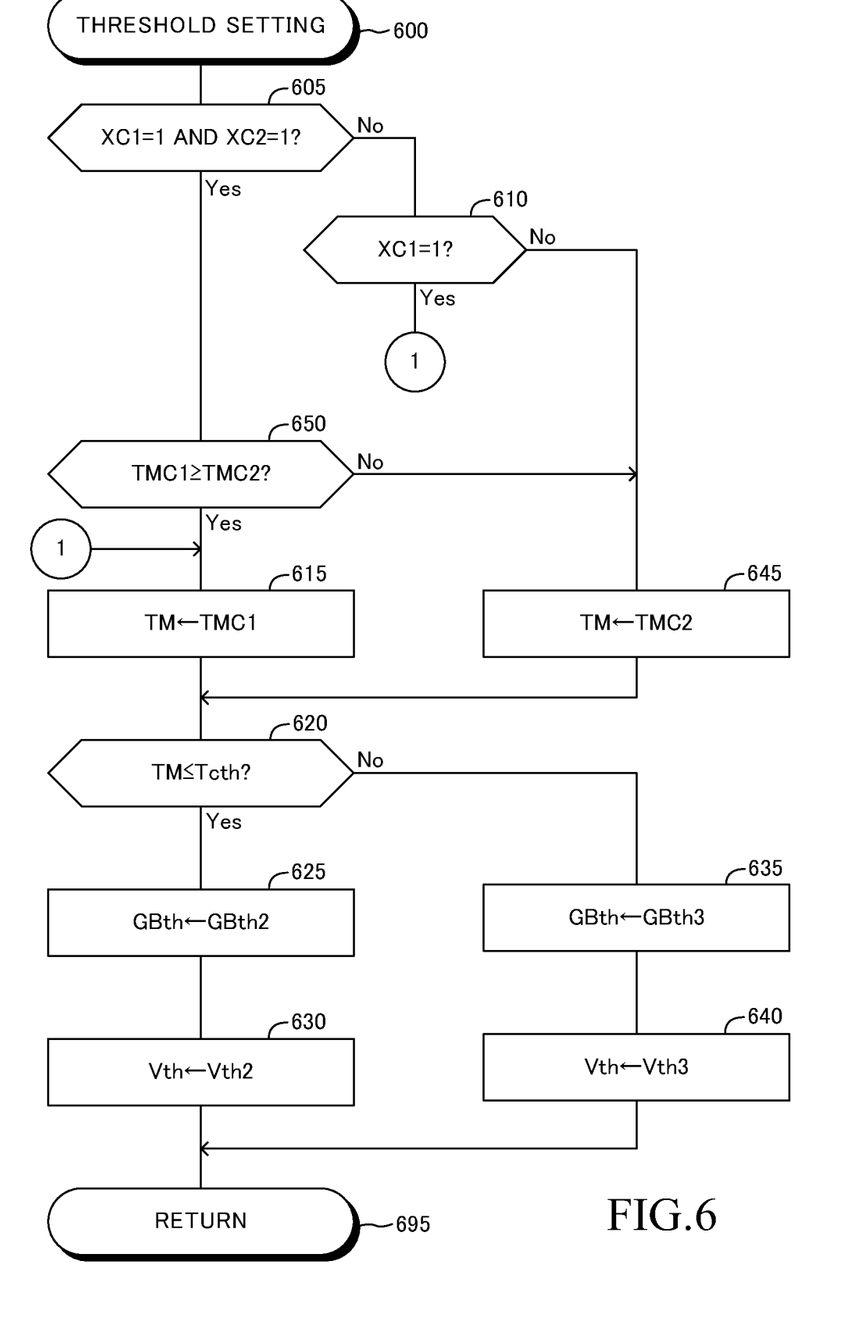
FIG. 6 is a flowchart illustrating a threshold setting sub routine executed by the CPU of the driving assistance ECU shown in FIG. 1.

When the CPU proceeds to step 570, the CPU starts processing from step 600 in FIG. 6, and proceeds to step 605. At step 605, the CPU determines whether or not both of the value of the asleep state flag XC1 and the value of the erroneous operation flag XC2 are "1"

When at least one of the value of the asleep state flag XC1 and the value of the erroneous operation flag XC2 is "1", the CPU makes a "No" determination at step 605, and proceeds to step 610. When the value of the asleep state flag XC1 is "1", the CPU makes a "Yes" determination at step 610, and sequentially executes processes of step 615 and step 620.

Step 615: the CPU sets a value of an elapsed time timer TM to the value of the asleep state timer TMC1.

Step 620: the CPU determines whether or not the value of the elapsed time timer TM is equal to or smaller than a predetermined constant time threshold Tcth. The value of the constant time threshold Tcth has been set at a value that the elapsed time timer TM reaches when the elapsed time reaches the constant time Tc.

When the elapsed time timer TM is equal to or smaller than the constant time threshold Tcth, the CPU makes a "Yes" determination at step 620, and sequentially executes processes of step 625 and step 630.

Step 625: the CPU sets the low impact collision threshold GBth to the value of GBth2.

Step 630: the CPU sets the integral value threshold Vth to the value of Vth2.

Thereafter, the CPU proceeds to step 695 to terminate the present routine tentatively, and proceeds to step 535 shown in FIG. 5.

If the elapsed time timer TM is greater than the constant time threshold Tcth when the CPU proceeds to step 620, the CPU makes a "No" determination at step 620, and sequentially executes processes of step 635 and step 640.

Step 635: the CPU sets the low impact collision threshold GBth to the value of GBth3.

Step 640: the CPU sets the integral value threshold Vth to the value of Vth3.

Thereafter, the CPU proceeds to step 695 to terminate the present routine tentatively, and proceeds to step 535 shown in FIG. 5.

If the value of the asleep state flag XC1 is "0" when the CPU proceeds to step 610, the value of the erroneous operation flag XC2 is "1", since a "No" determination has been made at step 605. In this case, the CPU makes a "No" determination at step 610, and proceeds to step 645. At step 645, the CPU sets the value of the elapsed time timer TM to the value of the erroneous operation timer TMC2. Thereafter, the CPU performs processes of step 620 and subsequent steps.

If both of the value of the asleep state flag XC1 and the value of the erroneous operation flag XC2 are "1" when the CPU proceeds to step 605, the CPU makes a "Yes" determination at step 605, and proceeds to step 650.

At step 650, the CPU determines whether or not the value of the asleep state timer TMC1 is equal to or greater than the value of the erroneous operation timer TMC2.

When the value of the asleep state timer TMC1 is equal to or greater than the value of the erroneous operation timer TMC2, the CPU makes a "Yes" determination at step 650, and sets the sets the value of the elapsed time timer TM to the value of the asleep state timer TMC1 at step 615. Thereafter, the CPU performs processes of step 620 and subsequent steps.

Whereas, when the value of the asleep state timer TMC1 is smaller than the value of the erroneous operation timer TMC2, the CPU makes a "No" determination at step 650, and sets the value of the elapsed time timer TM to the value of the erroneous operation timer TMC2. Thereafter, the CPU performs processes of step 620 and subsequent steps.

<First Brake Control Routine>

Figure 7:
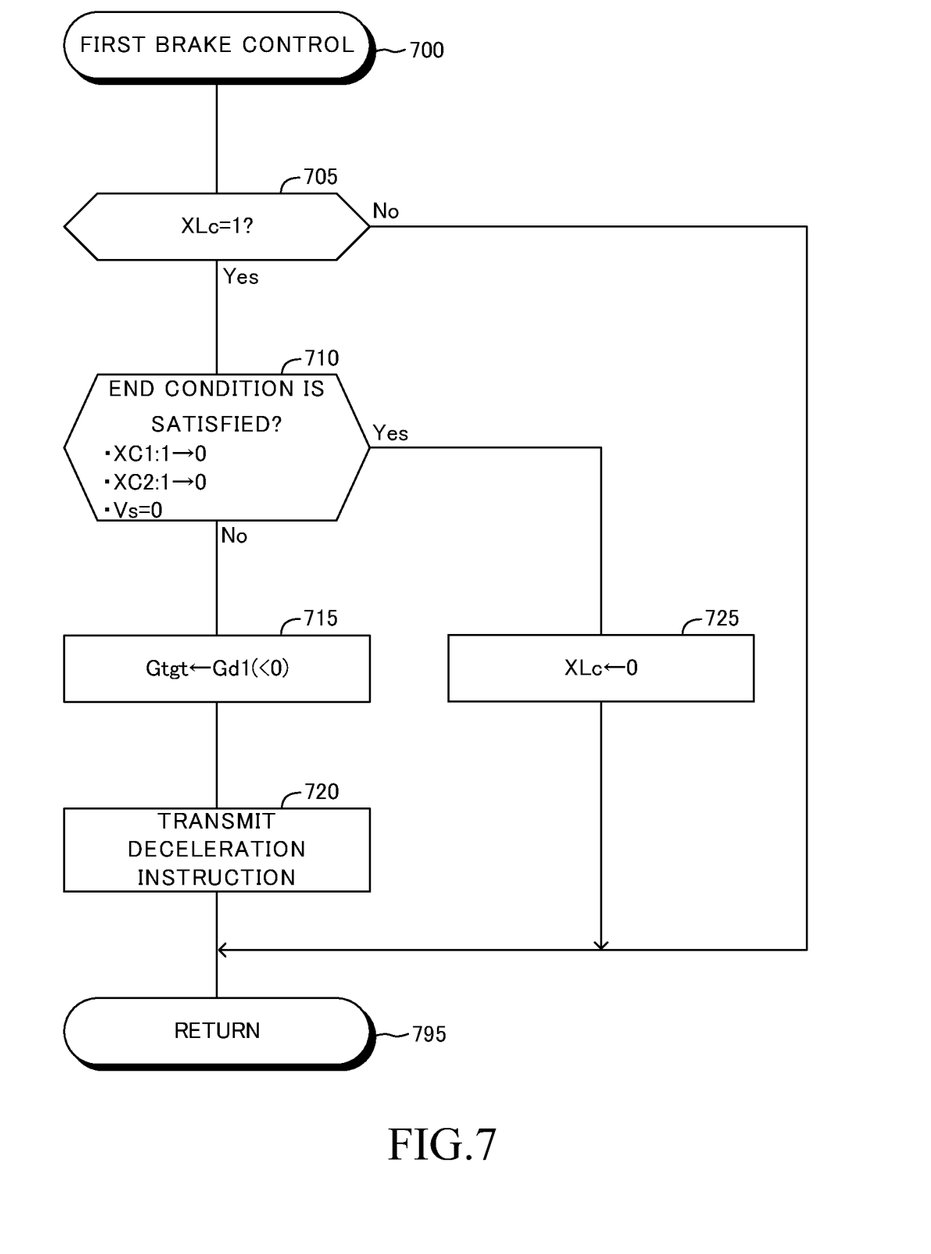
FIG. 7 is a flowchart illustrating a first brake control routine executed by the CPU of the driving assistance ECU shown in FIG. 1.

The CPU is configured or programmed to execute a first brake control routine shown by a flowchart in FIG. 7 every time a predetermined time elapses.

When an appropriate time point comes, the CPU starts processing from step 700 in FIG. 7, and proceeds to step 705. At step 705, the CPU determines whether or not the value of the low impact collision flag XLc is "1".

When the value of the low impact collision flag XLc is "0", the CPU makes a "No" determination at step 705, and proceeds to step 795 to terminate the present routine tentatively.

Whereas, when the value of the low impact collision flag XLc is "1", the CPU makes a "Yes" determination at step 705, and proceeds to step 710.

At step 710, the CPU determines whether or not an end condition of the first brake control becomes satisfied.

More specifically, the CPU determines that the end condition of the first brake control becomes satisfied, when one of conditions D1-D3 described below becomes satisfied.

Condition D1: the driver has returned (to the normal state) from the drowsy/asleep state, and thus, the value of the asleep state flag XC1 has been changed from "1" to "0".

Condition D2: the erroneous operation to the acceleration pedal 32*a* has ended, and thus, the value of the erroneous operation flag XC2 has been changed from "1" to "0".

Condition D3: the vehicle speed Vs has reached "0 km/h".

When none of the above-described conditions D1-D3 is satisfied, the CPU makes a "No" determination at step 710, and sequentially executes processes of step 715 and step 720.

Step 715: the CPU sets a target acceleration Gtgt to a predetermined first deceleration Gd1 (<0).

Step 720: the CPU transmits a deceleration instruction that includes information on the target acceleration Gtgt to the driving ECU 30 and the brake ECU 40.

The driving ECU 30 and the brake ECU 40 control the driving source actuator 34 and the brake actuator 44, respectively, in such a manner that the front-rear direction component Gx of the acceleration G of the vehicle becomes equal to the above-described first deceleration Gd1, when they receive the deceleration instruction.

Thereafter, the CPU proceeds to step 795 to terminate the present routine tentatively.

When one of the above-described conditions D1-D3 is satisfied, the CPU makes a "Yes" determination at step 710, and proceeds to step 725. At step 725, the CPU sets the value of the low impact collision flag XLc to "0". Thereafter, the CPU directly proceeds to step 795 to terminate the present routine tentatively. Accordingly, when one of the above-described conditions D1-D3 is satisfied, the CPU does not transmit the deceleration instruction, and therefore, the first brake control is ended (terminated).

<Second Brake Control Routine>

Figure 8:
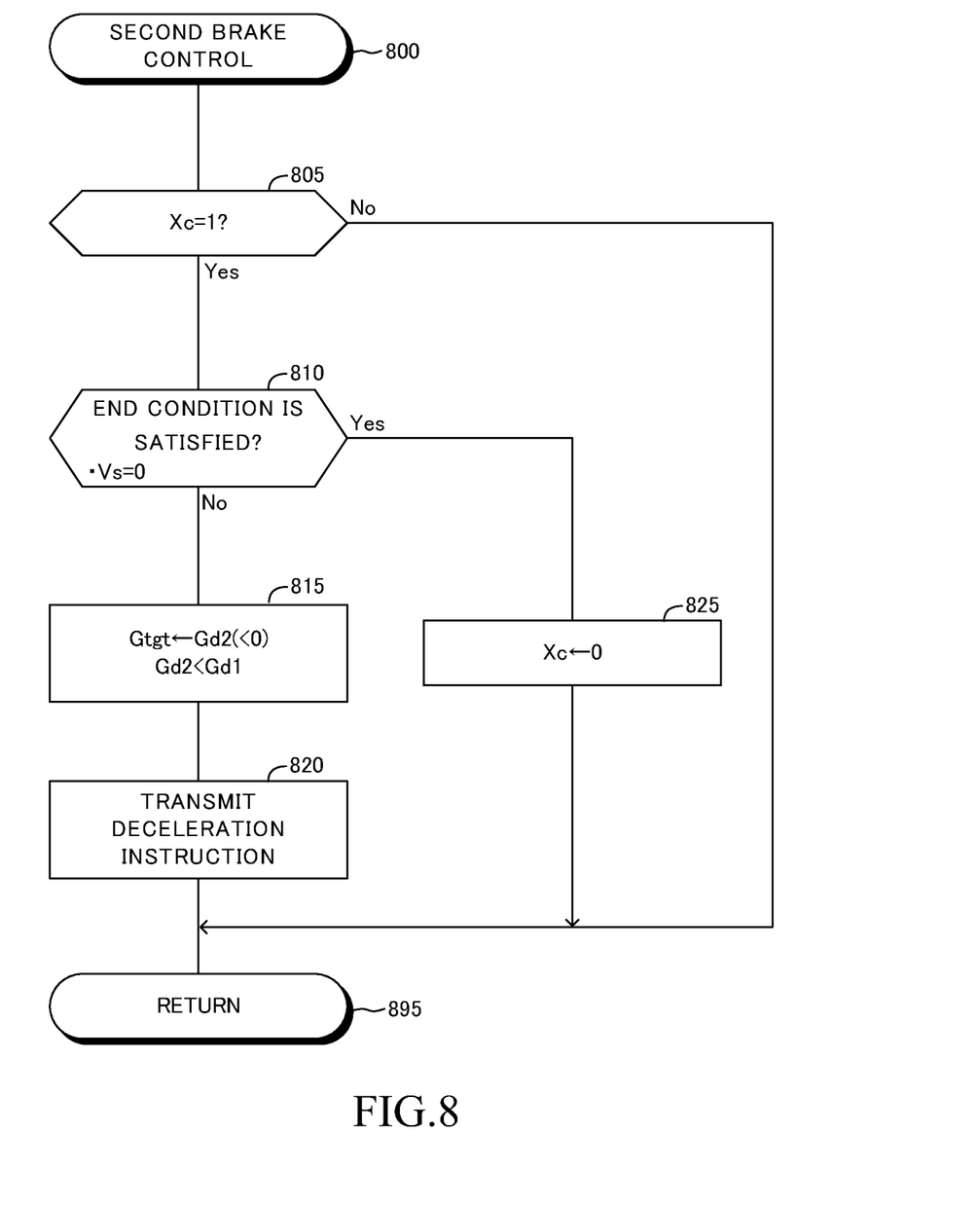
FIG. 8 is a flowchart illustrating a second brake control routine executed by the CPU of the driving assistance ECU shown in FIG. 1.

The CPU is configured or programmed to execute a second brake control routine shown by a flowchart in FIG. 8 every time a predetermined time elapses.

When an appropriate time point comes, the CPU starts processing from step 800 in FIG. 8, and proceeds to step 805. At step 805, the CPU determines whether or not the value of the collision flag Xc is "1".

When the value of the collision flag Xc is "0", the CPU makes a "No" determination at step 805, and proceeds to step 895 to terminate the present routine tentatively.

Whereas, when the value of the collision flag Xc is "1", the CPU makes a "Yes" determination at step 805, and proceeds to step 810. At step 810, the CPU determines whether or not an end condition of the second brake control becomes satisfied.

More specifically, the CPU determines that the end condition of the second brake control becomes satisfied, when the above-described condition D3 becomes satisfied.

When the above-described condition D3 is not satisfied, the CPU makes a "No" determination at step 810, and sequentially executes processes of step 815 and step 820.

Step 815: the CPU sets the target acceleration Gtgt to a predetermined second deceleration Gd2 (<0). It should be noted that the second deceleration Gd2 has been set at a negative value smaller than the first deceleration Gd1.

Step 820: the CPU transmits a deceleration instruction that includes information on the target acceleration Gtgt to the driving ECU 30 and the brake ECU 40.

Thereafter, the CPU proceeds to step 895 to terminate the present routine tentatively.

When the above-described condition D3 is satisfied, the CPU makes a "Yes" determination at step 810, and proceeds to step 825. At step 825, the CPU sets the value of the collision flag Xc to "0". Thereafter, the CPU directly proceeds to step 895 to terminate the present routine tentatively. Accordingly, when the above-described condition D3 is satisfied, the CPU does not transmit the deceleration instruction, and therefore, the second brake control is ended (terminated).

In this manner, when the low impact collision has occurred, the value of the low impact collision flag XLc is set to "1", and the first brake control is performed. Whereas, when the collision has occurred, the value of the collision flag Xc is set to "1", and the deployment control (the deployment of the air-bag and the second brake control) is performed. In a case where the driver is in the anomalous state, the threshold used for determining the low impact collision (i.e., the low impact collision threshold GBth and the integral value threshold Vth) becomes smaller. In other words, the threshold used for determining the low impact collision is set in such a manner that the low impact collision condition is more easily satisfied, as the above-described elapsed time is longer.

This can increase the possibility that the first brake control is performed when the vehicle collides with a guardrail, a curbstone, or the like, and decrease the possibility that the driver feels annoyed at the first brake control even when the first brake control is erroneously performed.

The present disclosure should not be limited to the above-described embodiment, and may employ various other modifications of the present disclosure.

First Modification

The driving assistance apparatus 10 according to the first modification performs a driving force suppressing control in place of the first brake control, when the low impact collision has occurred. The driving force suppressing control is a control to suppress an actual driving force which the driving source 34a generates in such a manner that the actual driving force is made to be smaller than a "required driving force determined based on the accelerator operation amount AP". Alternatively, the driving force suppressing control may be a control to let the driving source 34a generate a threshold driving force when the required driving force is equal to or greater than the threshold driving force. Namely, the driving force suppressing control may be a control to impose a limit on the actual driving force which the driving source 34a generates in such a manner that the actual driving force does not exceed the threshold driving force.

The first brake control and the driving force suppressing control are for controlling the brake force of the vehicle VA or the driving force of the vehicle VA, and thus, each of them may be sometimes referred to as a "brake-and-drive control".

The driving assistance apparatus 10 according to the first modification may perform the above-described driving force suppressing control in place of the second brake control, when the collision has occurred.

Second Modification

The driving assistance apparatus 10 according to the second modification is configured to determine that the low impact collision has occurred when the above-described first condition becomes satisfied, even when the above-described second condition does not become satisfied.

It should be noted that determining that the low impact collision has occurred when both of the first condition and the second condition become satisfied can reduce a possibility to erroneously determine that the low impact collision has occurred in a case where the vehicle is traveling on a rough road. This is because the magnitude of the acceleration integral value V obtained when the low impact collision has actually occurred tends to be greater than the magnitude of the acceleration integral value V obtained while the vehicle is traveling on the rough road.

Third Modification

In the above-described embodiment, the low impact collision threshold GBth and the acceleration integral value V are caused to become smaller than the respective ones in the normal state at the time point (the time point t2 shown in FIG. 2) at which the anomalous state condition becomes satisfied. In addition, in the above-described embodiment, the low impact collision threshold GBth and the acceleration integral value V are caused to become further smaller at the time point (the time point t3 shown in FIG. 3) at which the constant time Tc elapses since the anomalous state condition became satisfied. In contrast, the driving assistance apparatus 10 according to the third modification is configured to decrease the low impact collision threshold GBth and the acceleration integral value V by respective values every time the constant time Tc elapses after the anomalous state condition became satisfied.

Fourth Modification

The above-described embodiment makes the low impact collision condition be more easily satisfied as the elapsed time becomes longer by decreasing the low impact collision threshold GBth and the integral value threshold Vth. However, as long as the low impact collision condition is made to be more easily satisfied as the elapsed time becomes longer, any measure can be taken. For example, the driving assistance apparatus 10 according to the fourth modification is configured to decrease at least one of the low impact collision threshold GBth and the integral value threshold Vth, as the elapsed time becomes longer.

Fifth Modification

The driving assistance apparatus 10 according to the fifth modification is configured to determine that the low impact collision condition becomes satisfied, when a first product of a first weighting factor α and the acceleration G is equal to or greater than the low impact collision threshold GBth and a second product of a second weighting factor β and the acceleration integral value V is equal to or greater than the integral value threshold Vth. In this case, the low impact collision condition is made to be more easily satisfied by increasing at least one of the first weighting factor α and the second weighting factor β, as the elapsed time becomes longer.

Sixth Modification

The driving assistance apparatus 10 according to the sixth modification is configured to deploy the air-bag 62 without performing the second brake control, when the collision has occurred.

Seventh Modification

The driving assistance apparatus 10 can be installed in (applied to) an engine vehicle, a hybrid vehicle (HEV: Hybrid Electric Vehicle), a plug-in hybrid vehicle (PHEV: Plug-in Hybrid Electric Vehicle), a fuel cell vehicle (FCEV: Fuel Cell Electric Vehicle), an electric motor vehicle (Battery Electric Vehicle), or the like. The driving assistance apparatus 10 can also be applied to an autonomous control vehicle.

What is claimed is:

1. A driving assistance apparatus comprising:
an acceleration sensor configured to measure an acceleration acting on a body of a vehicle; and
a control unit configured to perform a damage mitigation control to mitigate a damage caused by a collision when said vehicle collides,
wherein, said control unit is configured to:
perform, as said damage mitigation control, a deployment control that includes at least a control to deploy an air-bag of said vehicle, when a collision indicating value, obtained based on said acceleration, indicative of a degree of said collision of said vehicle satisfies a predetermined collision condition;
perform, as said damage mitigation control, a brake-and-drive control to make a driving force of said vehicle smaller than a required driving force of a driver of said vehicle or to apply a brake force to said vehicle, when said collision indicating value does not satisfy said collision condition and satisfies a predetermined low impact collision condition that is to be satisfied when a low impact collision having a degree of collision lower than a collision having a degree of collision that satisfies said collision condition has occurred;
change said low impact collision condition in such a manner that said low impact collision condition becomes satisfied more easily as an elapsed time of an anomalous state where said driver is not driving normally becomes longer;
determine that said collision condition is satisfied when said collision indicating value is equal to or greater than a predetermined collision threshold;
determine that said low impact collision condition is satisfied when a first condition is satisfied and a second condition is satisfied, said first condition being a condition that said collision indicating value (i) is equal to or greater than a predetermined low impact collision threshold that has been set at a value smaller than said collision threshold and (ii) is smaller than said collision threshold;
said second condition being a condition that a magnitude of an integral value of said collision indicating value is equal to or greater than a predetermined integral value threshold;
make said low impact collision condition be satisfied more easily as said elapsed time becomes longer, by making said low impact collision threshold smaller and making said integral value threshold smaller; and
determine that said driver is in said anomalous state, when an erroneous operation state where said driver erroneously operates an acceleration element that is an element to be operated in order to accelerate said vehicle has occurred, or when said driver is in an asleep state.

* * * * *